June 24, 1958
N. TARNOW
2,840,395
CONDUIT FITTING WITH SPRING WASHER
RETAINING MEANS
Filed May 6, 1957
2 Sheets-Sheet 1
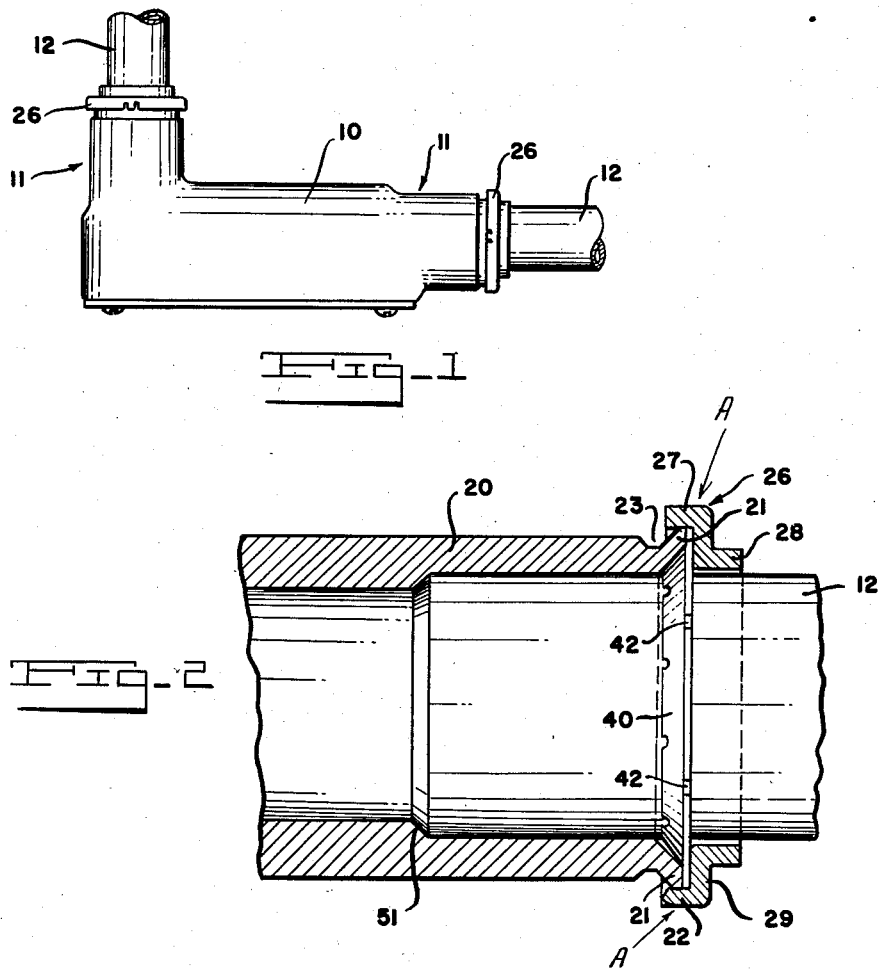
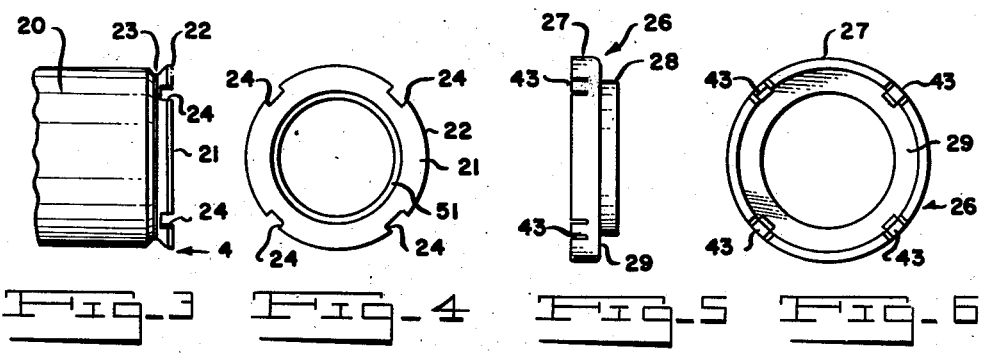
INVENTOR.
NATHAN TARNOW
BY Cullen & Cantor
ATTORNEYS June 24, 1958  N. TARNOW  2,840,395
CONDUIT FITTING WITH SPRING WASHER
RETAINING MEANS
Filed May 6, 1957  2 Sheets-Sheet 2
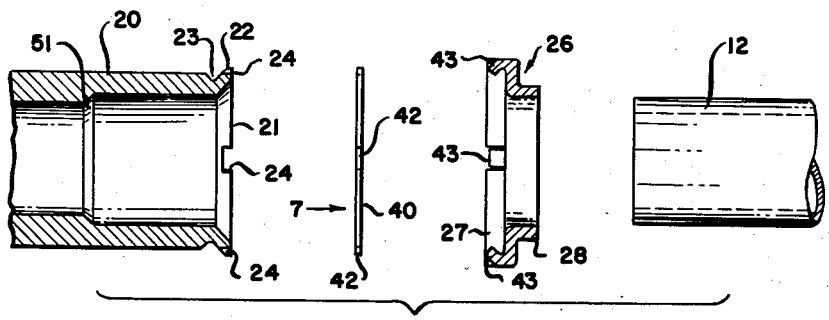
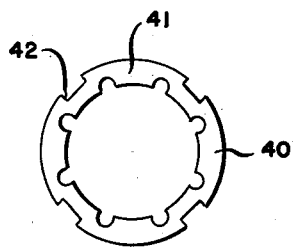
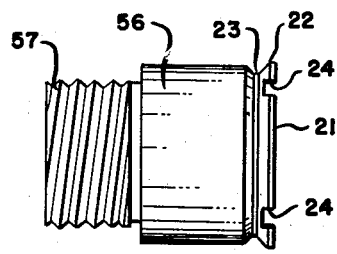
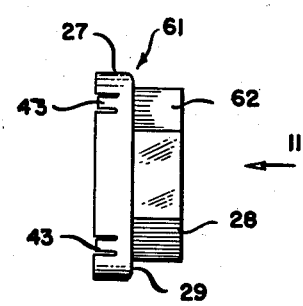
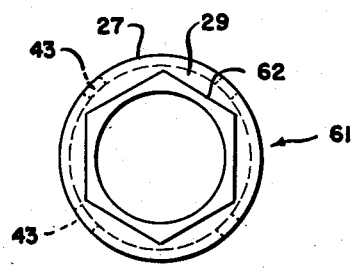
INVENTOR.
NATHAN TARNOW
BY Cullen & Canton
ATTORNEYS

United States Patent Office 2,840,395
Patented June 24, 1958

2,840,395

CONDUIT FITTING WITH SPRING WASHER RETAINING MEANS

Nathan Tarnow, Framington, Mich.

Application May 6, 1957, Serial No. 657,324

1 Claim. (Cl. 285—321)

This application relates to conduit fittings particularly useful in securing ends of electric conduit in fixed relation to base members such as other conduit, condulets, junction boxes, and the like.

The present practice in securing electric conduit, particularly where the conduit is of the thick wall variety rather than the thin wall variety, is to thread the conduit and secure it by threaded members.

It is an object of the present invention to provide a fitting so arranged and constructed that a thread on the conduit is not required.

A still further object of the present invention is the providing of a fitting for conduit which will secure a conduit to a base member without the necessity of threading either the base member or the conduit but which cooperates with a smooth wall conduit and which can be manipulated without the use of special tools or other equipment.

A still further object of the invention is the provision of a fitting so constructed that it may be manually manipulated in reverse direction for releasing the conduit from the base member and thus permitting removal of a conduit when desired.

Still further objects of the present invention will appear hereafter upon full consideration of the embodiments of the invention herein disclosed, such embodiments being described in the following specification which refers to the appended drawings.

In these drawings, which show embodiments of the invention:

Fig. 1 is a small scale elevation view of a condulet equipped with fittings of the invention and shown as securing conduits to both ends of the condulet;

Fig. 2 is a double scale section view of the fitting in use with a conduit end, with only a housing ring and retaining ring of the assembly being shown in half section, and with a conduit and a spring washer of such assembly being shown in elevation, as these parts actually look when assembled;

Fig. 3 is a full scale elevation view of a tubular member part of the fitting, per se;

Fig. 4 is an end view as if from the right of Fig. 3;

Fig. 5 is an elevation view of a locking ring part of the fitting, per se;

Fig. 6 is an end view of the locking ring as if from the right of Fig. 5;

Fig. 7 shows a locking washer of the fitting;

Fig. 8 is an exploded view of the parts in section ready to be assembled for securing a conduit end in place;

Fig. 9 shows a modified form of tubular member part of the fitting, per se;

Figs. 10 and 11 are views like Figs. 5 and 6, but showing a modified form of locking ring, flat sided for manipulation by a wrench or the like.

Referring to the drawings, it will be seen that Fig. 1 shows a base member 10 in the form of a condulet at whose ends are fittings 11 of the invention, with these fittings being shown in Fig. 1 as securing conduit ends 12 to the base member 10.

In the form shown in Figs. 1 to 8 of the drawings the fitting 11 includes a tubular member 20 which is shown as integral with the base member 10. The tubular member 20 has an internal diameter only slightly larger than the external diameter of the conduit end 12 so as rather closely to receive such conduit end. The fitting 20 has a forward edge 21 formed with an outwardly extending annular shoulder 22 whose forward and rearward walls are beveled rearwardly and inwardly towards the axis of the member 20. Thus, behind the shoulder 22 is a V groove 23 for purposes later to be described.

The shoulder 22 is formed with a plurality of circularly spaced notches 24, there being four such notches at 90° spacing in the specific embodiment shown.

The fitting also includes a retaining ring 26 of a cross-section which provides a cylindrical side portion 27 and an annular side portion 28 separated by a flat forward annular portion 29 which fits closely against the shoulder 22. The side portion 27 fits closely around the shoulder 22.

The fitting also includes a flat thin spring locking washer 40 adapted to be disposed between the flat portion 29 of the ring 26 and the shoulder 22, and the locking spring washer has internal teeth 41 for biting into the conduit 12 inserted into the fitting through the ring and washer. The washer is initially flat and is adapted to be dished rearwardly as shown in Fig. 2 by insertion of the conduit 12 into the fitting and when the washer is so dished it prevents separation of the conduit from the fitting.

The washer has circularly spaced notches 42 on its outer edge for cooperating with circularly spaced inwardly projecting lugs 43 of the portion 27 of the ring 26. The lugs are spaced rearwardly from the rear face of the ring portion 29 for enabling the washer to be interlockingly fitted into the ring and held there by the lugs 43 with the washer in flat condition whereby the washer may be applied to the ring to form with it an assembly or sub-unit of a ring and washer. This assembly can be applied as a sub-unit to a tubular member 20 with the lugs 43 of the ring now serving not only to hold the washer 40 in the ring 26 but also serving to interlock through the notches 24 of the shoulder 22 and behind the shouder 22 and in the groove 23 of the tubular member 20 and thus interlock the assembly 26—40 to the tubular member 20. The circular spacing of the lugs 43, the notches 24 of the tubular member 20 and the notches 42 of the washer 40 all are identical, 90° in the illustration shown, to enable the washer notches 42 to clear the ring lugs 43 and to enable the ring lugs 43 to clear the shoulder notches 24, thus enabling assembly and disassembly of the parts.

In assembling the washer in the ring, the washer is placed in the ring with its notches 42 aligning with the lugs 43 and then the washer is rotated a few degrees so that the notches 42 are no longer in alignment with the lugs 43 and these lugs now prevent separation of the washed from the ring. In assembling the ring onto the tubular member 20 the lugs 43 are aligned with the notches 24 of the shoulder 22 and then the ring is rotated a few degrees to move the lugs 43 out of alignment with the notches 24 and thus interlock the ring behind the shoulder 22.

When a fitting is completed by assembly of washer 40 in ring 26 and assembly of a sub-unit 26—40 on tubular member 20, the fitting is ready for receiving a conduit 12 which may be inserted into the fitting through the aligned central holes of the washer, the ring, and the tubular member. The washer at this moment is flat and the conduit end will slide rather smoothly into the tubular member 20 until movement of the conduit is stopped as for example, by engagement of the end of the conduit with a shoulder 51 of the tubular member 20 where such member has its internal diameter reduced. If an effort is made to pull the conduit out of the fitting such effort will be resisted by the fact that the washer had become dished rearwardly as shown in Fig. 2 during the movement of the conduit end into the fitting due to the friction between the washer and the conduit. With the washer so dished, its internal teeth 41 will bite into the conduit and prevent separation of the conduit 12 from the fitting. Thus, the fitting will serve to hold the conduit firmly in place in the tubular member 20 and thus in the base member 10 of which the tubular member is an integral part.

Instead of the tubular member 20 being an integral part of the base member 10 as just described and as shown in Fig. 1 to 8, it is possible to form the tubular member as shown in Fig. 9 of a separate element 56 having a male threaded end 57 which cooperates with a female threaded end of a base member not shown whereby the tubular member 56 will become functionally an integral part of the base member though structurally it is initially separate from such base member. The tubular member 56 in such cases is an adapter for adapting a conventional condulet or the like having female threaded ends for receiving and interlocking in place unthreaded conduit ends such as the smooth conduit shown at 12 in Fig. 8.

Whereas Figs. 1 to 8 show the fitting as including a retaining ring 26 whose external surface is circular, it is entirely possible, to facilitate rotation of the retaining ring on the tubular member 20, to form the retaining ring 61 with flat surfaces as shown at 62 in Figs. 10 to 11 for cooperation with a wrench or the like. However, experience has shown that a circular outer contour for the retaining ring is adequate and no flat surfaces are necessary in most cases for in most cases manual grip on the retaining ring is adequate for rotating the retaining ring onto the tubular member 20 and off it when desired.

Now having described the fitting herein disclosed, reference should be had to the claim which follows.

I claim:

A fitting for securing a conduit end comprising a tubular member which has a forward edge formed with an outwardly extending annular shoulder whose forward and rearward walls are beveled rearwardly and inwardly, the fitting also including an annular retaining ring of a cross section providing a cylindrical side portion and a flat forward portion, the ring side portion closely fitting around the shoulder of the tubular member and the ring forward portion fitting flat against such shoulder, and a flat thin annular spring washer between the ring forward portion and the shoulder and having internal teeth for biting into a conduit end inserted into the tubular member through the ring and washer, the washer being initially flat and being dished rearwardly by insertion of the conduit end into the fitting and when so dished preventing retraction of the conduit end from the fitting, the fitting being characterized by the fact that the washer has circularly spaced notches on its outer edge cooperating with circularly spaced inwardly projecting lugs of the ring side portion, which lugs are spaced rearwardly from the rear face of the ring forward portion for enabling the washer to be interlockingly fitted into the ring and held there in flat condition by the lugs whereby the washer may be applied to the ring to form with it a ring-washer assembly or sub-unit which can be applied to a tubular member, the outer edge of the shoulder of the latter having circularly spaced notches, with the lugs of the ring serving not only to hold the washer in the ring but also serving to interlock through the shoulder notches and behind the shoulder of the tubular member and to interlock the assembly to the tubular member, the circular spacing of the lugs, the shoulder notches and the washer notches all being identical to enable the washer notches to clear the ring lugs and to enable the ring lugs to clear the shoulder notches, thus enabling assembly and disassembly of the fitting.

References Cited in the file of this patent
UNITED STATES PATENTS

| | | |
|---|---|---|
| 1,440,207 | Burns | Dec. 26, 1922 |
| 2,149,681 | Johnston | Mar. 7, 1939 |
| 2,284,365 | Briegel | May 26, 1942 |
| 2,484,192 | Squiller | Oct. 11, 1949 |